Figure 1:
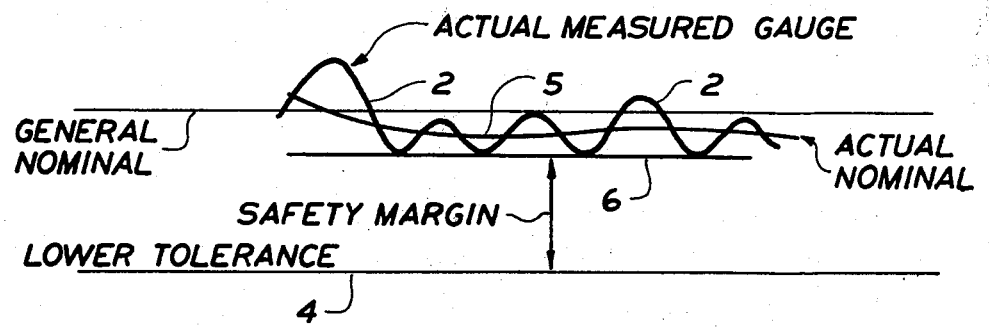

United States Patent [19]

Peirson et al.

[11] 4,257,093

[45] Mar. 17, 1981

[54] NOMINAL ADAPTIVE CONTROL USING MOST RECENT EXCURSION IN A PROPERTY VARIATION

[75] Inventors: Robert C. Peirson, Murrysville, Pa.; James R. Vanada, Pleasant Valley, Iowa; Paul C. Donatelli, Trafford, Pa.

[73] Assignee: Aluminum Company of America, Pittsburgh, Pa.

[21] Appl. No.: 20,646

[22] Filed: Mar. 15, 1979

[51] Int. Cl.$^3$ .................. G05B 13/02; G06F 15/46
[52] U.S. Cl. ........................ 364/105; 364/119; 364/472; 364/552; 364/563
[58] Field of Search ............... 364/105, 118, 119, 552, 364/554, 563, 472, 474, 469; 318/621, 622

[56] References Cited

U.S. PATENT DOCUMENTS

| | | | |
|---|---|---|---|
| 2,767,914 | 10/1956 | Merrill et al. | 364/119 X |
| 3,151,237 | 9/1964 | Hrabak | 364/119 X |
| 3,464,549 | 9/1969 | Armbruster | 364/552 X |
| 3,515,860 | 6/1970 | Fitzgerald, Jr. | 364/119 X |
| 3,876,872 | 4/1975 | Spitz | 364/105 |
| 3,881,651 | 5/1975 | Wilhelm, Jr. | 364/552 X |

*Primary Examiner*—Joseph F. Ruggiero
*Attorney, Agent, or Firm*—Elroy Strickland

[57] ABSTRACT

A method of automatically maintaining a nominal property value of a material near a limiting value in the process of making the material. The method involves the steps of imparting to the material a property that varies about the nominal value, and measuring the varying property, the measured property having positive and negative excursions about the nominal value. Determination is then made of the amplitudes of the excursions, and the nominal value of the property is adjusted to a predetermined limiting value in response to the amplitude of the most recent excursion, i.e., the nominal value is adjusted toward or away from the predetermined limiting value in respective response to any decrease or increase in the amplitude of the most recent excursion relative to the amplitude of the excursion immediately preceding the most recent excursion.

4 Claims, 2 Drawing Figures

NOMINAL ADAPTIVE CONTROL USING MOST RECENT EXCURSION IN A PROPERTY VARIATION

BACKGROUND OF THE INVENTION

The present invention relates generally to the automatic control of a manufacturing process, such as the process of reducing the thickness of metal in a rolling mill, and particularly to automatically setting the exit gage of such metal close to a limiting value, though the invention is not limited to gage control and the control of rolling mills.

In reference to a rolling mill, as an example of the utility of the present invention, the thickness or gage of material leaving the mill is generally measured by a device located at the exit end of the mill. This device is part of an automatic gage control (AGC) system which functions to make corrections in the mill when the thickness of the metal leaving the mill deviates from a desired nominal gage value. There are times, however, when it is desirable to locate this nominal value closer to an upper or lower limit of the value. In the case of reducing the thickness of metal in a rolling mill, substantial savings in metal can be effected if the nominal is shifted down toward a lower limit but in a manner that does not allow variations in gage to go below the lower limit. By not permitting gage variations to go below the lower limit, a rolled product is provided with a minimum thickness value while simultaneously effecting the above savings in metal, overagainst the operation of the standard automatic gage control, which simply maintains the nominal within a bandwidth centered on the nominal.

Variations in the thickness of rolled metal are imparted to the metal in the rolling process. Such variations are due to many factors, including variations in the gage or hardness of the metal entering a mill, eccentricity in backup and work roll assemblies of the mill, variations in the tension of the metal between the stands of the mill, and other factors. The resulting gage of the metal exiting the mill is the sum of all of these variations, many of them cyclic and some due to long-term effects such as the growth in the diameter of the backup rolls, i.e., the temperature of mill rolls increases from room temperature, at the time of start-up of the rolling process, to a higher, steady state value after an interim period of time.

BRIEF SUMMARY OF THE INVENTION

In quantifying the size of the variation in thickness of the material leaving a rolling mill, the term "bandwidth" is used to describe the peak-to-peak variation in thickness and in the output signal of the device measuring thickness. If one-half of the bandwidth is less than the difference between the nominal and the lower limit, the nominal thickness, hereinafter referred to as nominal gage, can be lowered to effect the above savings of metal.

The present invention is directed to lowering the nominal gage, keeping in mind, as suggested above, that there are cases where increasing the nominal toward an upper or maximum limit may instead be desirable. The setting and maintenance of a lower gage nominal, in the present invention, is effected by determining the sizes or amplitudes of negative peaks in gage variation, as the material leaves a mill, and then lowering the nominal in a manner that locates the negative peaks close to a lower limiting level or value. The size of each negative peak, as it is produced by a thickness measuring device, is evaluated, with the nominal being adjusted down if the peak is smaller than the lower limiting value or adjusted up if the peak is larger. Thus, the amplitude of the most recent peak is employed to set the nominal.

Such a method is simple and provides the fastest response to changes in gage, as it is the last negative excursion of the variation in gage that is used for correction. This is in contrast to the use of statistical measurements and estimates in gage variation, which usually require the assumption that the variation is Gaussian. Such methods involve determining (i.e. computing) the mean and variance of the statistics, such as disclosed in U.S. Pat. No. 3,515,860 to Fitzgerald.

THE DRAWING

Figure 2:
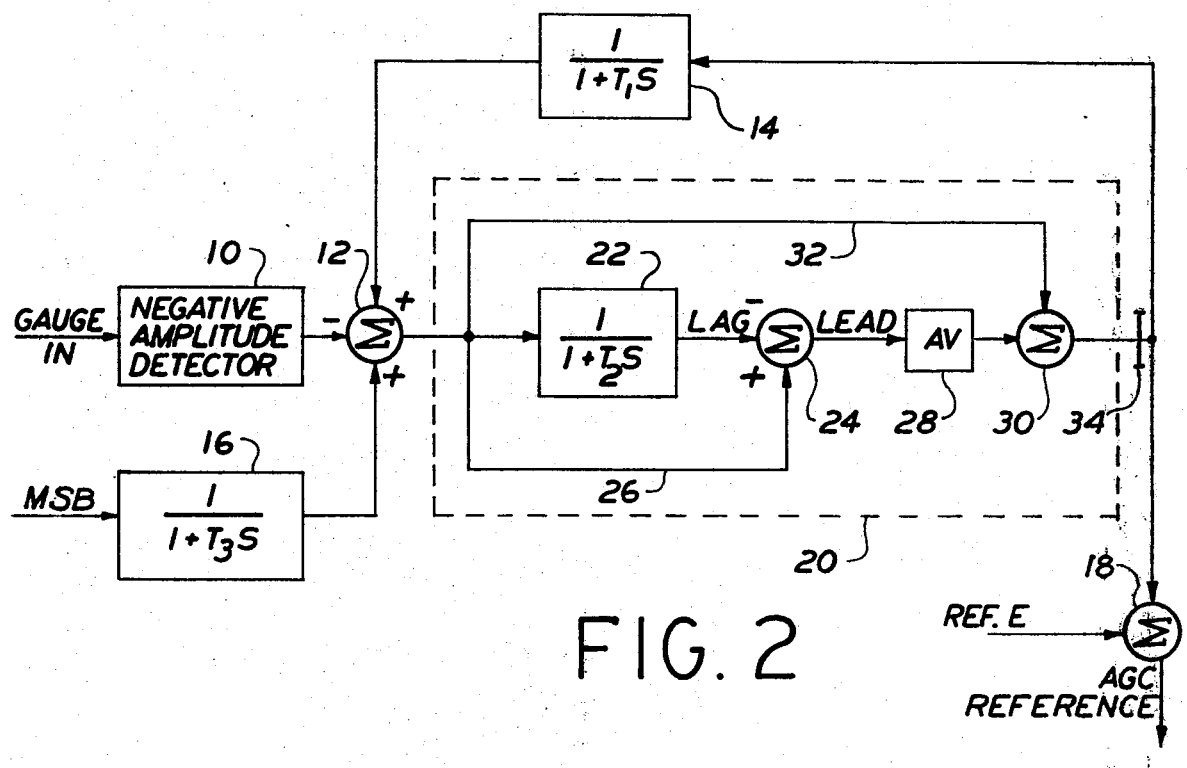

The invention, along with its objectives and advantages, will best be understood from consideration of the following detailed description and the accompanying drawing, in which:

FIG. 1 is a diagrammatic representation of a chart recording showing an actual measurement of thickness of a traveling sheet of metal exiting from a rolling mill; and FIG. 2 is a flow diagram of the system of the present invention.

PREFERRED EMBODIMENTS OF THE INVENTION

Referring now to FIG. 1 of the drawing, a center, horizontal line 1 is labelled "general nominal", which is the nominal or average of the above variations in the thickness or gage of material exiting from a rolling mill (not shown) after being reduced in thickness in the mill. In FIG. 1, the variations about the nominal are indicated by numeral 2. Two horizontal lines 3 and 4 located respectively above and below the nominal line and variations 2 represent the limits or bandwidth of the variations in the thickness desired.

More particularly, the automatic gage control (AGC) system in a rolling mill is employed to examine the thickness of the exiting metal and to order a change in mill behavior when the thickness tends to drift out of prescribed limits, such as indicated by horizontal lines 3 and 4 in FIG. 1, to return the metal thickness to a value within the limits. A computer can be a part of the AGC system, and is employed to make the necessary calculations and order the change, in response to the output of a device that measures the actual gage or thickness of the material leaving the mill. The nominal 1, however, stays the same, and no correction is made as long as the thickness of the exiting metal remains within the prescribed limits of 3 and 4.

In the present invention, however, the desired nominal is forced or shifted downwardly, as indicated by a curve 5 in FIG. 1 labelled "actual nominal", toward a "safety margin" limit indicated by a line 6, i.e., variations 2 in the gage of the material leaving the mill are thereby lowered such that the negative excursion of 2 touches or almost touches line 6. Line 6 is the lower half of a minimum safe bandwidth (MSB) for excursions 2. If the process of the invention were employed to maintain an upper or maximum property value in a material issuing from the system of the process, safety margin 6 would be located above the nominal line 1 but below limit line 3.

The actual nominal 5 can, of course, be shifted all the way to the lower tolerance limit 4 (in FIG. 1), except that errors exist in the gage measuring process and equipment, due to extraneous noise, etc., and in the cross section of the rolled metal because of the growth of crowns in the backup rolls of the mill, as explained earlier. For these reasons, a safety margin or minimum safe bandwidth is set that will not allow the excursions 2 in gage variation to occur lower than the margin.

The system or process for accomplishing the above downward shift in nominal gage is shown in FIG. 2. The device (not shown) capable of measuring the thickness of metal issuing from a rolling mill, as discussed above, produces a signal that represents deviations in metal thickness from a desired nominal thickness (gage). This measuring or gage measuring device, as explained above in connection with FIG. 1, is part of the above gage control (AGC) system that controls the operation of rolling stands of the mill to maintain the gage within predetermined limits 3 and 4 of the nominal. The signal from the gage measuring device may be a digital, integer signal which is scaled in a manner that provides a finite number of information bits (for a computer) that equals a finite thickness value, for example, 400 bits may equal one (1) mil deviation in metal thickness from the desired nominal, though other bit-to-thickness relationships can be used without departing from the spirit and scope of the invention. Similarly, the gage measuring device may provide an analogue signal that reflects gage deviation.

The deviation signal from the gage measuring device is applied to a detector 10 which determines the size or amplitude of the negative excursion or peak of the gage deviation signal. Detector 10 may be a diode-capacitor arrangement or a general purpose computer, analogue or digital, programmed to examine the signal from the thickness gage. In either case, the negative peak or excursion of gage variation 2 is watched by 10 for the "turn-around" of the excursion. The value of the negative peak at the time of turn-around, which is the "peak" value, is then held by the detector and subtracted at a summing location 12 from the sum of two additional signals applied to 12. One of these signals is developed by a decoupling process 14, presently to be explained in detail, while the other signal comes from a means 16 capable of generating a slow moving offset function that forces the nominal gage value 1 downwardly, in the manner of line 5 in FIG. 1, when the arrangement of FIG. 2 is turned on and the signal from 12 is employed to correct the mill.

The resulting signal from summation point 12 is the correction signal for lowering the desired nominal gage in the manner indicated in FIG. 1, i.e., to the safety margin or minimum safe bandwidth indicated by line 6. This can be accomplished by directing the correction signal to a reference summing junction 18 of the AGC system, the system therefore seeing a change in reference, and then functioning to change the operation of the mill to provide the desired lower nominal.

The signal from 12, as indicated above, is the sum of the signals from 14 and 16, from which is subtracted the signal from detector 10. More particularly, 14 mathematically simulates the dynamic operation of the AGC and mill, which simulation is a first order exponential lag signal having a time constant $T_1$ that is relatively short, i.e., on the order of two seconds. When this signal is combined with the signal from 10, the effect is a decoupling process which serves to remove the dynamics of the mill and its AGC from the correction provided by junction 12. In this manner, the control of the mill is now dependent only upon the size of the negative excursion in gage variation, as provided by detector 10. The S in the denominator of the function of 14, as well as in the first order functions of 16 and 22, presently to be explained, indicate the variable of the Laplace transform.

The initial application of the correction signal from 12 is slow so as not to upset the operation of the mill. As indicated earlier, this is accomplished by the signal from 16 to 12, which signal is a first order, slowly rising, i.e., on the order of ten seconds, exponential function that applies the correction from 12 to 18 in a gradual manner when the system of FIG. 2 is turned on, thereby allowing the AGC system of the mill to slowly move the nominal gage value in the downward direction of curve 5 in FIG. 1.

The forcing function provided at 16 also has an operative that establishes the minimum safe bandwidth (MSB) or safety margin 6 (FIG. 1) such that the lowering of nominal effected by 16 does not go beyond the bandwidth or margin. The MSB of 16 thus controls the amount of the reduction in gage effected by the system of FIG. 2. Again, the functions provided by 16 may consist of a circuit device having the appropriate time constant ($T_3$) or the functions can be provided by a general purpose computer.

After the nominal is forced down by means 16 to the reference provided by 12, the rate of the response of the AGC system and mill to the reference of 12 is increased by a lead-lag filter, generally designated in FIG. 2 by numeral 20. This is effected by directing the signal from 12 to a first order simulation 22, which simulation has a time constant ($T_2$) that is somewhat faster than that of the decoupling simulation of 14. The output from 22 is directed to a summing junction 24 where it is combined with the signal of 12, directly applied via line 26, to produce a lead function, and is multiplied by a gain having a value AV at 28. AV and $T_2$ are selected to be equal to the time constant of the simulation of the decoupling function of 14, which is $T_1$. The signal from 12 is also applied directly to another summing junction 30, via line 32, where it is combined with the signal from 28. As a result of the lead-lag function of the filter 20, with its shorter time constant $T_2$, 30, in turn, provides an output signal that is a relatively fast acting, control function that is operative within the bandwidth limits, as indicated by numeral 34 in FIG. 2, set by the function of 16.

The control function and correction signal from summing junction 30 are also sent through the lag function of 14 to the effect that any shift in the nominal ordered by 30 is deleted from the correction signal formed at 12. Thus, the correction signal at 12 will not be effected by the previous correction or shift in the nominal.

The first order functions provided by 14 and 22, like that of 16, can be effected by either suitable circuit hardware or by a general purpose computer programmed to make the appropriate responses.

The forcing function effected by 16 is gently reset by 16 if the negative excursion measured at 10 is larger than the preset limit provided at 16, i.e., resetting is accomplished by small shifts or increments back toward the original nominal (line 1) until the negative excursion of 2 is back within the limit 6 set within 16. Hence, the nominal 5, in FIG. 1, rises toward 1 until the negative excursions are back within limit 6.

It will be understood that the above description of the present invention is susceptible to various modifications, changes and adaptations, and the same are intended to be comprehended within the meaning and range of equivalents of the appended claims.

What is claimed is:

1. A method of automatically maintaining a nominal property value of a material near a limiting value in the process of making the material, the method comprising the steps of imparting to the material a property that varies about the nominal property value, measuring said property and producing a signal that is representative thereof, the measured property and resulting signal having positive and negative excursions about the nominal value, determining the amplitude of the most recent excursion, adjusting the nominal value of the property relative to a predetermined limiting value in response to the amplitude of the most recent excursion, and continually evaluating the amplitude of the excursions and continually adjusting the nominal value toward or away from the limiting value in respective response to a decrease or increase in the amplitude of the most recent excursion relative to the amplitude of the excursion immediately preceding the most recent excursion.

2. The method of claim 1 in which the predetermined limiting value is a minimum or lower value, and the most recent excursion of the nominal value is a negative excursion.

3. The method of claim 1 in which the predetermined limiting value is a maximum or upper value, and the most recent excursion of the nominal value is a positive excursion.

4. The method of claim 1 in which the property that varies about the nominal value thereof is the thickness of a material exiting from a production process, while the step of continually adjusting the nominal value involves the steps of measuring the thickness of the exiting material and ordering a change in the thickness of the material in the production process.

* * * * *